(12) United States Patent
Teshome et al.

(10) Patent No.: US 12,461,823 B2
(45) Date of Patent: Nov. 4, 2025

(54) DATA RECOVERY USING OUT-OF-BAND COMMUNICATIONS

(71) Applicant: Dell Products L.P., Round Rock, TX (US)

(72) Inventors: Abeye Teshome, Austin, TX (US); Gokul Thiruchengode Vajravel, Bangalore (IN); Richard M. Tonry, Georgetown, TX (US); Bassem El-Azzami, Austin, TX (US); Mohit Arora, Frisco, TX (US); Vinodkumar Vasudev Ottar, Mckinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 18/498,349

(22) Filed: Oct. 31, 2023

(65) Prior Publication Data

US 2025/0138945 A1    May 1, 2025

(51) Int. Cl.
G06F 11/14    (2006.01)
(52) U.S. Cl.
CPC .... *G06F 11/1415* (2013.01); *G06F 2201/805* (2013.01)

(58) Field of Classification Search
CPC ....... G06F 11/07–0736; G06F 11/0793; G06F 11/202–2053
See application file for complete search history.

(56) References Cited

U.S. PATENT DOCUMENTS

| | | |
|---|---|---|
| 5,283,905 A | 2/1994 | Saadeh |
| 5,367,670 A | 11/1994 | Ward |
| 5,402,431 A | 3/1995 | Saadeh |
| 7,590,760 B1 | 9/2009 | Banks |
| 7,599,907 B2 | 10/2009 | Havewala et al. |
| 8,020,192 B2 | 9/2011 | Wright et al. |
| 8,490,163 B1 | 7/2013 | Harsell et al. |

(Continued)

*Primary Examiner* — Michael Maskulinski
(74) *Attorney, Agent, or Firm* — WOMBLE BOND DICKINSON (US) LLP

(57) ABSTRACT

Methods and systems for managing a data processing system are disclosed. The data processing system may provide computer-implemented services and may include in-band hardware resources that operate as specified by operation data of the data processing system while providing the services. However, if the operation data becomes unavailable to the data processing system, then the data processing system may be unable to provide the desired services. Therefore, to increase the likelihood of providing the desired services, the operation data may be managed using distributed backup and recovery processes. To decrease security risk associated with operation data backup and recovery, the distributed processes may be performed using out-of-band components of the data processing system, bypassing in-band hardware components that may be more vulnerable to being compromised (e.g., by a malicious party). The out-of-band management of the operation data may reduce the likelihood of interruptions in providing the desired services.

20 Claims, 7 Drawing Sheets

(56) References Cited

U.S. PATENT DOCUMENTS

| | | |
|---|---|---|
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,909,575 B1 | 2/2024 | Mehrotra |
| 2003/0046394 A1 | 3/2003 | Goddard |
| 2003/0131262 A1 | 7/2003 | Goddard |
| 2004/0246893 A1 | 12/2004 | Ahrens, Jr. |
| 2013/0339302 A1 | 12/2013 | Zhang |
| 2013/0339303 A1 | 12/2013 | Potter |
| 2014/0317364 A1 | 10/2014 | Shepard |
| 2015/0067217 A1 | 3/2015 | Feehrer |
| 2015/0301880 A1 | 10/2015 | Allu |
| 2017/0139411 A1 | 5/2017 | Hartung |
| 2017/0242605 A1 | 8/2017 | Suryanarayana |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2018/0157525 A1 | 6/2018 | Song |
| 2018/0321719 A1 | 11/2018 | Munjal |
| 2019/0042372 A1 | 2/2019 | Kumar |
| 2019/0156019 A1 | 5/2019 | Chen |
| 2020/0371859 A1 | 11/2020 | Sayyed |
| 2021/0208963 A1* | 7/2021 | Ponnappan ......... G06F 11/3072 |
| 2021/0240567 A1 | 8/2021 | Hsu et al. |
| 2021/0263868 A1 | 8/2021 | Maddukuri |
| 2022/0179702 A1* | 6/2022 | Dawkins ............. G06F 11/3433 |
| 2022/0222328 A1 | 7/2022 | Talib et al. |
| 2023/0011379 A1 | 1/2023 | Thommana |
| 2024/0134756 A1 | 4/2024 | Tonry et al. |
| 2025/0004897 A1* | 1/2025 | Fan .................... G06F 11/3003 |

* cited by examiner

DATA RECOVERY USING OUT-OF-BAND COMMUNICATIONS

FIELD

Embodiments disclosed herein relate generally to managing data processing systems. More particularly, embodiments disclosed herein relate to systems and methods for managing recovery of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
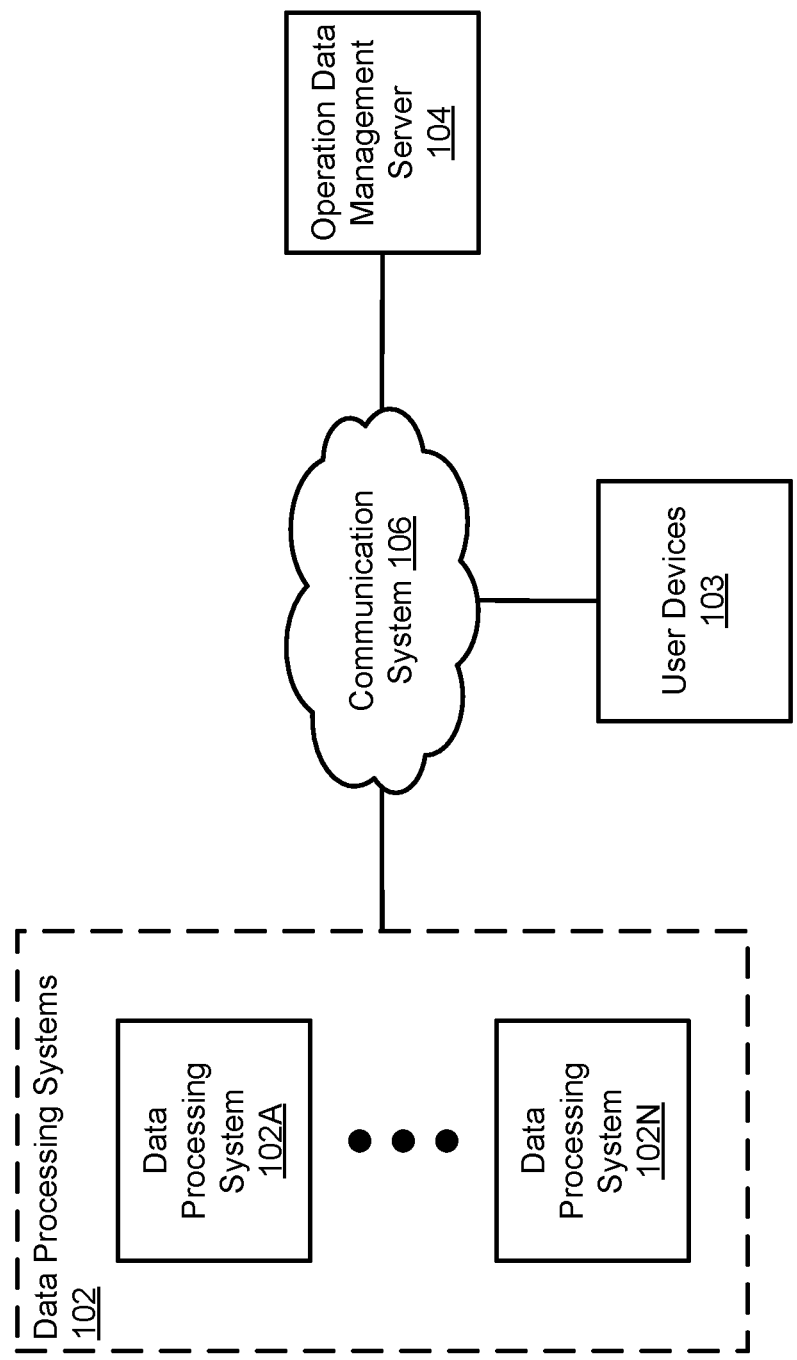
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing system recovery. For example, a data processing system may provide computer-implemented services. In order to provide desired computer-implemented services, hardware resources of the data processing system may need to operate in a particular manner that may be specified by operation data of the data processing system. For example, a user (or other entity) may define hardware and/or software configuration settings, install software, store data, etc., that may dictate the operation of one or more components of the data processing system. In other words, in order to provide the desired computer-implemented services, the data processing system may depend on the operation data being properly defined and accessible.

Over time, data processing systems may undergo servicing (e.g., of hardware and/or software components), may be reset (e.g., the operating system may be re-installed), and/or may be affected by other circumstances that may result in the operation data being modified, lost, inaccessible, and/or otherwise unavailable to the data processing system. As a result, the data processing systems may cease to operate in alignment with the operation data needed to provide the desired computer-implemented services. Therefore, in order to increase the likelihood of providing the desired computer-implemented services, the operation data may be recovered in order to restore the data processing system to its previous operation.

However, if a data recovery process for the data processing system is performed that relies on in-band components (e.g., a network stack, an operating system, etc.) for information exchange, then the data recovery process may present logistical issues, and/or a security risk to the operation data, the data processing system, the computer-implemented services, etc. For example, the operation data recovery process may require functionality of certain components that may not be available, and/or an in-band connection through a network used to transfer the operation data may not be trusted (e.g., the in-band connection may be subject to being compromised, which may compromise operation data exchanged using the in-band connection).

Thus, to reduce the security risk of operation data backup and/or recovery, and to increase the likelihood of the data processing system providing the desired computer-implemented services, an operation data management framework may be implemented. The framework may include processes performed using out-of-band components and out-of-band communication channels of the data processing system, thereby bypassing potentially compromised in-band components and in-band communication channels of the data processing system.

By doing so, embodiments disclosed herein may provide a system for managing operation data of a data processing system using out-of-band communications. To do so, the system may include backup and recovery processes for the operation data that may be performed, in part, by an operation data management server that may communicate (e.g., via an out-of-band communication channel) with out-of-band components (e.g., a management controller) of the data processing system, operating independently of the in-band components of the data processing system. By circumventing in-band communication channels and components of the user device, the operation data may be trusted to modify operation of the hardware resources of the data processing system in order to provide the desired computer-implemented services.

In an embodiment, a computer-implemented method for managing a data processing system is provided. The method may include obtaining, by a management controller of the data processing system and via an out-of-band communication channel, operation data from an operation data management server, the operation data being usable to update operation of hardware resources of the data processing system, and the updated operation matching a past operation of a second data processing system based on the operation data.

The method may also include: conforming, by the management controller, the operation of the hardware resources as specified by the operation data to obtain the updated operation of the hardware resources; and providing a computer-implemented service using the updated operation of the hardware resources.

The method may also include, prior to obtaining the operation data: identifying, by the management controller, a condition impacting the hardware resources; and, sending, by the management controller and via the out-of-band communication channel, a notification to initiate an operation data recovery process for the hardware resources.

The operation data may be defined by a user of the data processing system.

Conforming the operation of the hardware resources may include providing, by the management controller, at least a portion of the operation data to an agent hosted by the hardware resources to initiate installation of software on the hardware resources using the agent.

Conforming the operation of the hardware resources may include updating a configuration of a hardware component of the hardware resources using the operation data.

The method may also include, prior to obtaining the operation data: identifying, by the management controller, a modification to the operation of the hardware resources, the modification being a result of user activity; and, providing, by the management controller, information regarding the modification to the operation data management server to facilitate making of a same future modification.

The method may further include, prior to obtaining the operation data: obtaining, by the operation data management server, a notification to initiate an operation data recovery process for the hardware resources; identifying, by the operation data management server, the operation data based on the notification; identifying, by the operation data management server, the management controller based on the notification; and, providing, by the operation data management server and via the out-of-band communication channel, the operation data to the management controller.

The data processing system may include a network module adapted to separately advertise network endpoints for the management controller and the hardware resources, the network endpoints being usable by the operation data management server to address communications to the hardware resources and the management controller.

The management controller and the network module may be on separate power domains from the hardware resources so that the management controller and the network module are operable while the hardware resources are inoperable.

The operation data may be obtained while the hardware resources are inoperable due to being unpowered.

The out-of-band communication channel may run through the network module, and an in-band communication channel that services the hardware resources also runs through the network module.

The management controller may host a transmission control protocol/internet protocol (TCP/IP) stack to facilitate network communications via the out-of-band communication channel.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The (distributed) system shown in FIG. 1A may provide computer-implemented services. The computer-implemented services may include any type and quantity of services including, for example data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. For example, data processing systems 102 may provide computer-implemented services to users of data processing systems 102. In order to provide desirable computer-implemented services, a data processing system (e.g., of data processing systems 102) may need to perform certain types of operations. To perform the certain types of operations, data processing systems 102 may need to host various pieces of software, may need to include various software configurations, may need to include various hardware configurations, and/or may need to meet certain requirements (e.g., in aggregate, the "operation data"). For example, the operation data may be defined by a user of the data processing system and/or may include hardware and/or software configuration settings, factory settings, user settings, user data, operating system, software, etc.

However, if operation data for a data processing system is unavailable to the data processing system and/or the data processing system is not aligned with the operation data, then the computer-implemented services may not be provided as desired. For example, if a configuration of a hardware component of the data processing system is misaligned with the operation data, then the data processing system may provide computer-implemented services that differ from those expected by the user that defined the operation data. Or, for example, if a user of the data processing system (or other entity) (i) replaces one or more failed hardware components (e.g., a motherboard) of the data processing system, resulting in a loss of the operation data, (ii) removes and/or modifies software (e.g., an operating system) of the data processing system, and/or (iii) retires the data processing system and wishes to set up a new data processing system (e.g., including new hardware components), then the operation data may become inaccessible to the data processing system.

In general, embodiments disclosed herein may provide methods, systems, and/or devices for managing operation data for a data processing system in order to increase the likelihood that the operation data is available to the data processing systems and/or that the operation of the hardware resources of the data processing systems is aligned with the operation data. To do so, an operation data management server may manage and/or participate in backup and recovery processes for the operation data of the data processing systems. The backup and recovery processes may be performed using out-of-band communication channels established between the data processing systems and the operation data management server in order to reduce the likelihood of encountering logistical and/or security issues associated with data backup and recovery. The backup and storage processes may be initiated and/or facilitated by users of the data processing systems, and/or may be performed automatically (e.g., by one or more components of the system of FIG. 1A).

To perform the above-mentioned functionality, the system of FIG. 1A may include data processing systems 102, user devices 103, and/or operation data management server 104 (e.g., including a data repository (not shown)). Data processing systems 102, user devices 103, operation data management server 104, and/or any other type of devices (not shown in FIG. 1A) may perform all, or a portion of the computer-implemented services independently and/or cooperatively. Each of these components is discussed below.

Data processing systems 102 may include any number and/or type of data processing systems (e.g., 102A, 102N). Each data processing systems of the data processing systems 102 may be operated by a user and/or may provide computer-implemented services based on operation data of each of the data processing systems. Data processing systems 102 may participate in the management of their operation data.

For example, each data processing system of data processing systems 102 may (i) facilitate modifications (e.g., by the user) to operation data of the data processing system, (ii) participate in a backup process and/or a recovery process for the operation data (e.g., where data exchange is performed using an out-of-band communication channel established with an operation data management server (e.g., 104)), (iii) update operation of hardware resources of the data processing system based on updated operation data (e.g., obtained as part of a recovery process), and/or (iv) perform other actions relating to the management of operation data (e.g., identify modifications to the operation data, report the modifications to the operation data to other entities, etc.). Refer to the discussion of FIGS. 2A-2B for additional details regarding backup and recovery processes using data processing systems 102.

User devices 103 may include any number and/or type of user devices. For example, a user device of user devices 103 may include a personal device that may be operated by a user. Each of user devices 103 may include an application usable for participating in the management of operation data for data processing systems 102. For example, the application may allow the user to provide information to an operation data management server (e.g., 104) that may participate in a recovery process for a data processing system (e.g., 102A) managed by the operation data management server.

To provide its functionality, operation data management server 104 may (i) obtain information regarding operation data (e.g., notifications, backup requests, recovery requests, etc.) from data processing systems 102 and/or from other devices (e.g., user devices 103), (ii) obtain data (e.g., operation data) from data processing systems 102 via out-of-band components (e.g., out-of-band communication channels) of data processing system 102A (e.g., while participating in a backup process for the operation data), (iii) provide data (e.g., operation data) to data processing systems 102 via out-of-band components of data processing system 102A (e.g., while participating in a recovery process for the operation data), and/or (iv) perform other actions relating to the management of operation data (e.g., organize, store, identify, and/or otherwise manage operation data for any number of data processing systems 102).

By performing backup and recovery processes for operation data of data processing systems 102 using out-of-band components (e.g., communication channels), the operation data may be made available to the data processing system without relying on the operation and/or security of (in-band) hardware resources of the data processing systems. For example, the hardware resources and/or in-band communication channels used by the hardware resources may be compromised by a malicious party. Thus, by using out-of-band components (e.g., out-of-band communication channels), data exchanged during the backup and/or recovery processes (e.g., operation data) is less likely to be leaked to and/or modified by the malicious party.

Figure 3A:
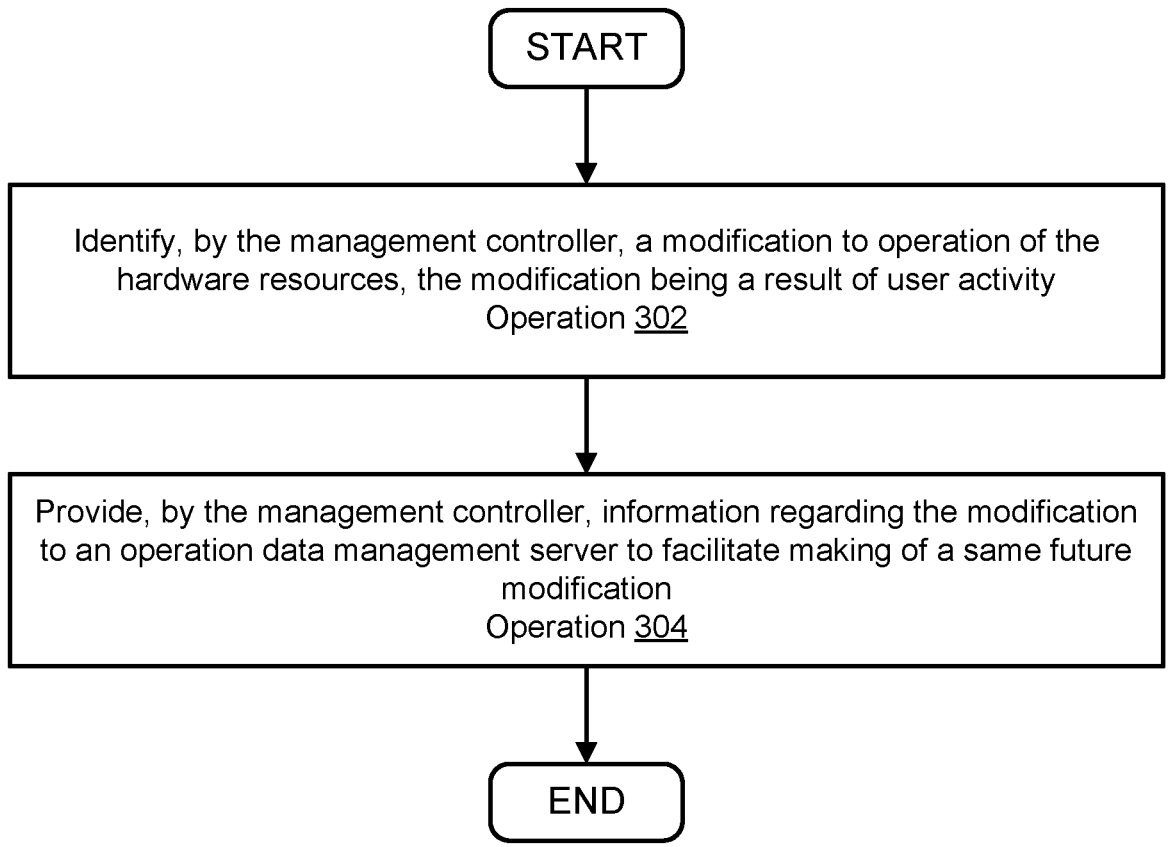
FIG. 3A shows a flow diagram illustrating a method for backing up operation data of a data processing system in accordance with an embodiment.
Figure 3B:
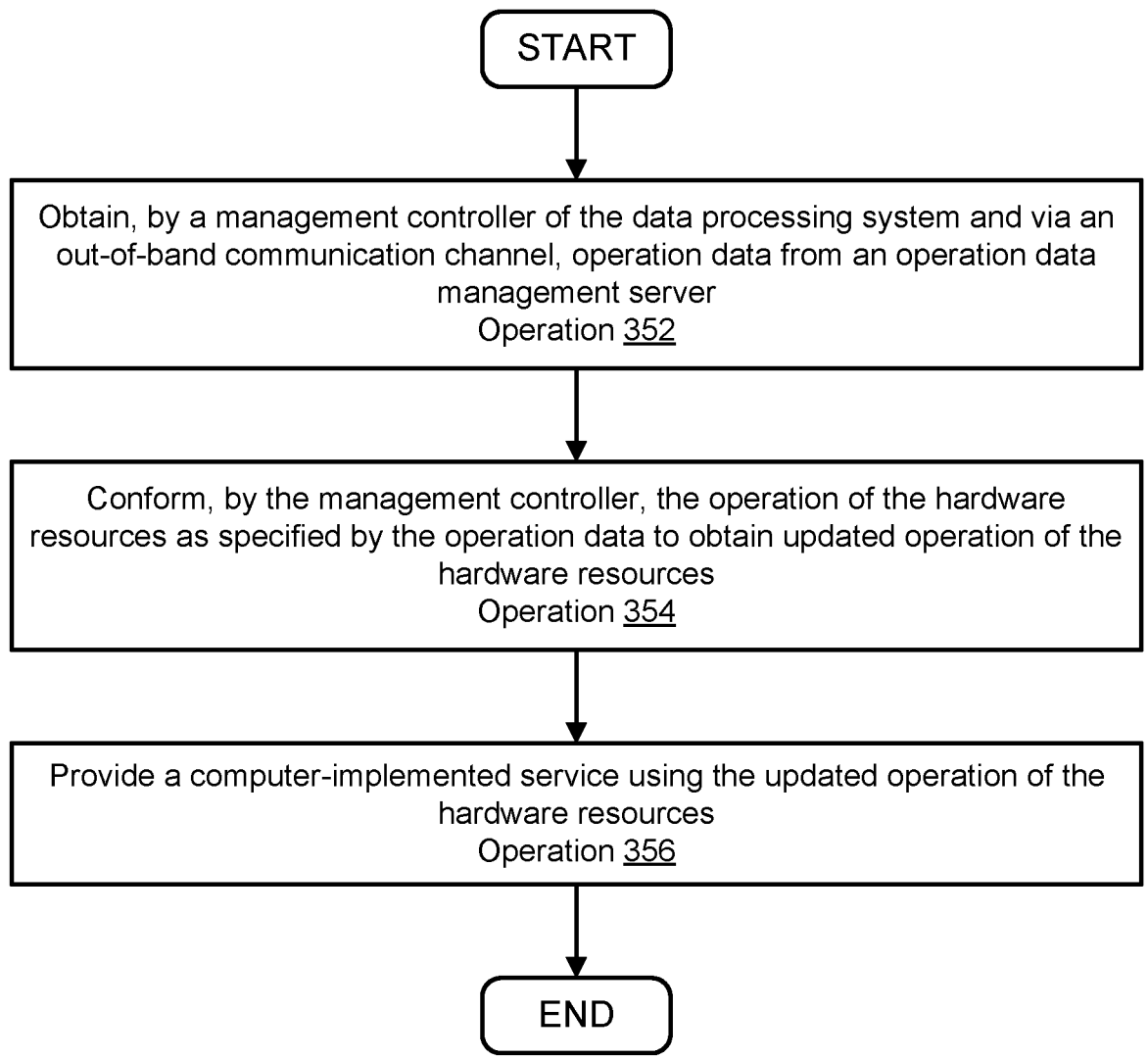
FIG. 3B shows a flow diagram illustrating a method for recovering operation data for a data processing system in accordance with an embodiment.

When providing their functionality, any of data processing systems 102, user devices 103, and/or operation data management server 104 may perform all, or a portion of the methods shown in FIGS. 3A-3B.

Any of (and/or components thereof) data processing systems 102, user devices 103, and/or operation data management server 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing systems 102, user devices 103, and/or operation data management server 104 are implemented using an internet of things (IoT) device, which may include a computing device. The IoT device may operate in accordance with a communication model and/or management model known to data processing systems 102, user devices 103, operation data management server 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single operation data management server (e.g., 104), it will be appreciated that the system may include any number of operation data management servers.

Figure 1B:
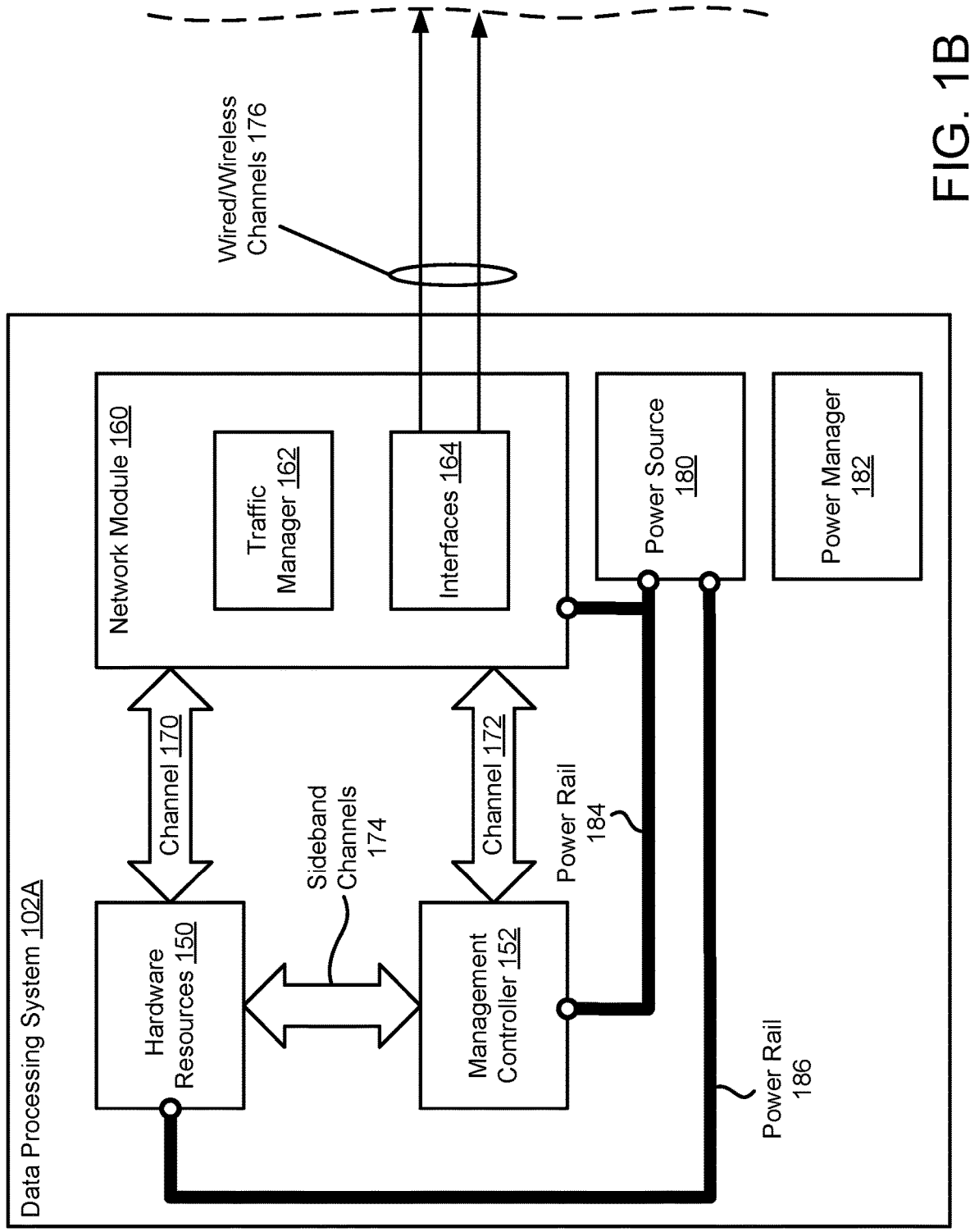
FIG. 1B shows a block diagram illustrating a data processing system in accordance with an embodiment.

Turning to FIG. 1B, a diagram illustrating a data processing system in accordance with an embodiment is shown. The data processing system (e.g., data processing system 102A) shown in FIG. 1B may be similar to any of the computing devices (e.g., data processing systems 102) shown in FIG. 1A.

To provide computer-implemented services, data processing system 102A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102A) to another device via any number of intermediate networks (e.g., via wired/wireless channels 176 that are part of the networks).

To reduce the likelihood of the applications and/or other in-band entities from being indirectly compromised, data processing system 102A may include management controller 152 and network module 160. Each of these components of data processing system 102A is discussed below.

Management controller 152 may be implemented, for example, using a system on a chip or other type of independently operating computing device (e.g., independent from the in-band components, such as hardware resources 150 of a host data processing system 102A). Management controller 152 may provide various management functionalities for data processing system 102A. For example, management controller 152 may monitor various ongoing processes performed by the in-band components, may manage power distribution, thermal management, and/or may perform other functions for managing data processing system 102A.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102A may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, an operation data management server (e.g., 104) participating in an operation data recovery process for data processing 102A may address a message to (e.g., provide operation data via) a network endpoint advertised by network module 160 for out-of-band communications. Once the message is received by the network endpoint, traffic manager 162 may then forward the message to management controller 152 via an out-of-band communication channel (e.g., channel 172), differentiating the message from in-band communications to data processing system 102A, which may be addressed to a different (e.g., separate) network endpoint. Thus, if in-band components of data processing system 102A are unsecured and/or compromised, then the message (e.g., the operation data) sent using out-of-band components may be less likely to be intercepted and/or modified.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These component may support any number of wired/wireless channels 176.

Thus, from the perspective of an external device, the in-band components and out-of-band components of data processing system 102A may appear to be two independent network entities, that may be independently addressable and/or otherwise unrelated to one another.

To facilitate management of data processing system 102A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. For example, if hardware resources 150 are unavailable, then management controller 152 may still participate in operation data backup and/or recovery processes.

To implement the separate power domains, data processing system 102A may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
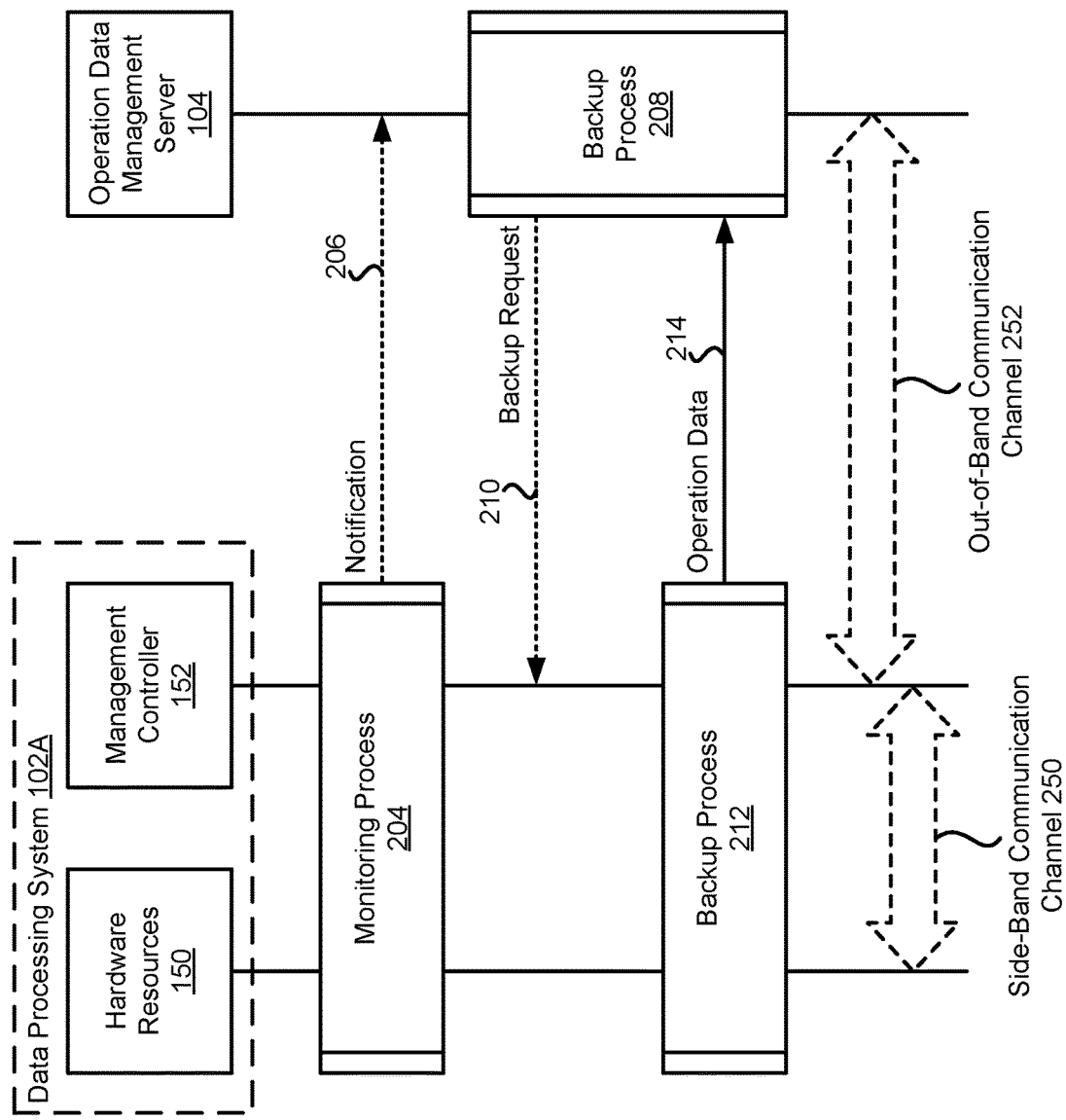
FIG. 2A shows an interaction diagram illustrating a backup process for operation data of a data processing system in accordance with an embodiment.
Figure 2B:
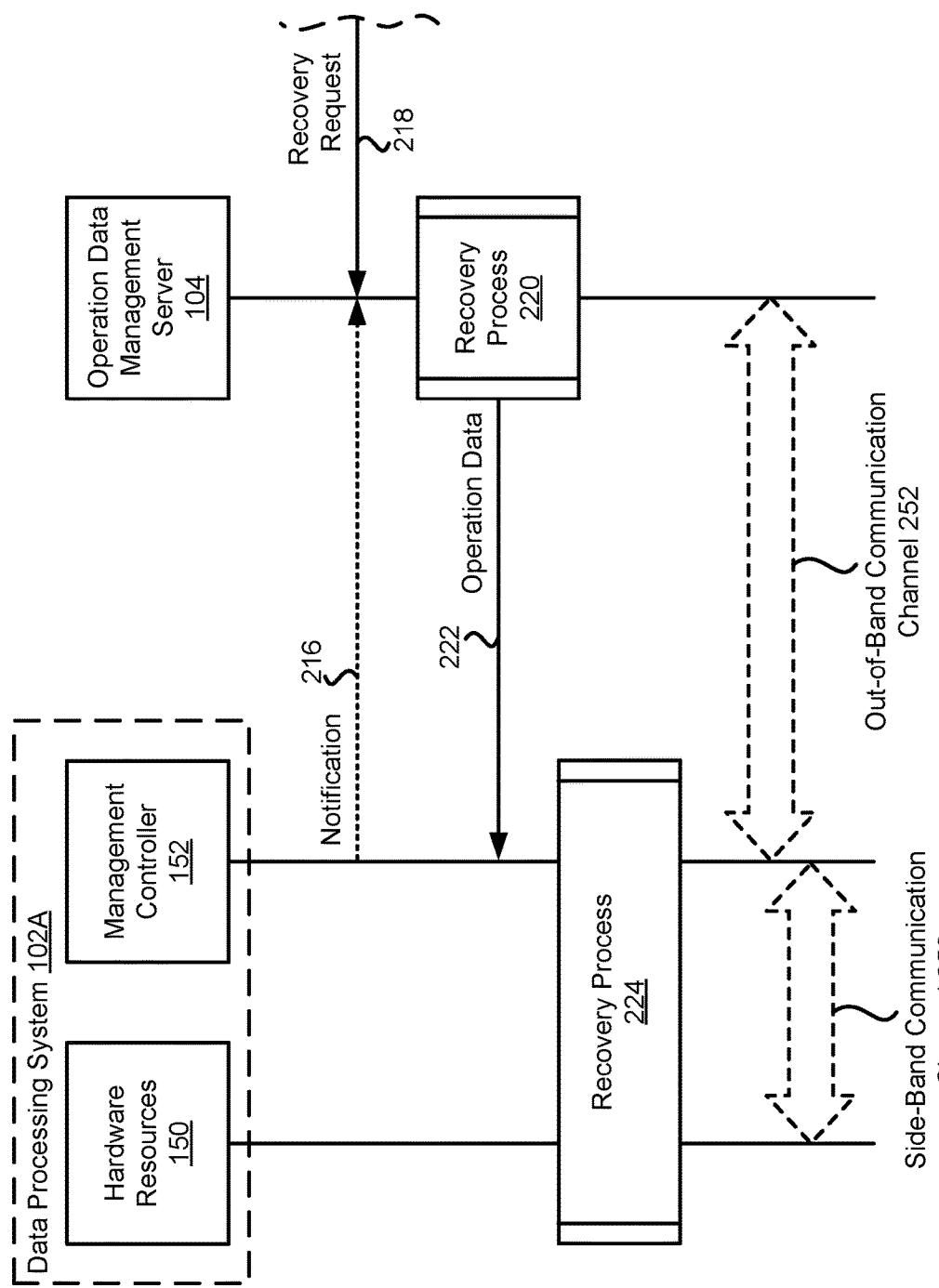
FIG. 2B shows an interaction diagram illustrating a recovery process for operation data of a data processing system in accordance with an embodiment.

To further clarify embodiments disclosed herein, an interaction diagrams in accordance with an embodiment is shown in each of FIGS. 2A-2B. The interaction diagrams may illustrate how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 200A, 202A, etc.), located towards the top of each figure. Lines descend from these shapes. Processes performed by the components of the system are illustrated using a second set of shapes (e.g., 204, 208 etc.) superimposed over these lines.

Interactions (e.g., communication, data transmissions, etc.) between the components of the system are illustrated using a third set of shapes (e.g., 214, 218, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines terminating in one or two arrows that are drawn in dashing (e.g., 206, 210) may indicate, for example, that the corresponding interaction(s) (i) may be optional, and/or (ii) may occur depending on the outcome of the processes and/or other interactions occurring in the diagram (or for other reasons).

Generally, the processes and interactions are temporally ordered in an example order, with time increasing from the top to the bottom of each page. For example, the interaction labeled as 206 may occur prior to the interaction labeled as 210. However, it will be appreciated that the processes and interactions may be performed in different orders, any may be omitted, and other processes or interactions may be performed without departing from embodiments disclosed herein.

The processes shown in FIGS. 2A-2B may be performed by any entity shown in the systems of FIGS. 1A-1B (e.g., a device similar to one of data processing systems 102, a server similar to operation data management server, etc.) and/or another entity without departing from embodiments disclosed herein.

Turning to FIG. 2A, a first interaction diagram in accordance with an embodiment is shown. The first interaction diagram may illustrate processes and interactions that may occur during backing up of operation data of a data processing system (e.g., 102A). Data processing system 102A may include hardware resources 150 and management controller 152. Hardware resources 150 may operate in accordance with operation data of data processing system 102A in order to provide desired computer-implemented services.

Over time, operation data of data processing systems may be modified, removed, and/or may be otherwise unavailable to the data processing systems. For example, the operation data may be modified as a result of user activity. The user may, for example, install software, adjust hardware and/or firmware settings, and/or perform other actions that may result in one or more modifications being made to the operation data. Therefore, to manage operation data, a distributed backup process for the operation data may be performed using components shown in FIG. 2A. The distributed backup process may include monitoring processes and/or backup processes performed by one or more of the components.

To identify modifications to the operation data, management controller 152 may perform monitoring process 204. During monitoring process 204, management controller 152 may (i) instruct hardware resources 150 to report changes made to the operation data (e.g., as a result of user activity), (ii) identify changes in data structures hosted by hardware resources 150 (e.g., data structures that store settings, options, values, etc., for configuring components of a data processing system), and/or (iii) monitor activity and/or operation of hardware resources 150 for other reasons (e.g., to identify conditions impacting components of data processing system 102A).

Management controller 152 may identify modifications to operation data using information provided by hardware resources 150. For example, management controller 152 may automatically receive information regarding the modifications from hardware resources 150 (e.g., based on real-time detection of the modifications by hardware resources 150) and/or management controller 152 may (periodically) prompt hardware resources 150 to check for modifications made to the operation data. To do so, information may be exchanged between hardware resources 150 and management controller 152 using side-band communication channel 250 (e.g., via message transmission).

During monitoring process 204, management controller 152 may identify modifications to the operation data without direct involvement of hardware resources 150 (e.g., by snooping on-going activity and/or processes of hardware resources 150 using side-band communication channel 250). Once identified, management controller 152 may obtain the information regarding the modifications and/or may generate a notification regarding the modifications to the operation data.

At interaction 206, the notification may be provided to operation data management server 104 by (management controller 152 of) data processing system 102A. For example, the notification may be generated and provided to operation data management server 104 over out-of-band communication channel 252 via (i) transmission via a message, (ii) storing in a storage with subsequent retrieval by operation data management server 104, (iii) a publish-subscribe system where operation data management server 104 subscribes to updates from management controller 152 thereby causing a copy of the notification to be propagated to operation data management server 104, and/or (iv) other processes.

The notification may include, for example, (i) identifying information of data processing system 102A and/or a user thereof (e.g., usable by operation data management server 104 to identify out-of-band hardware resources associated with data processing system 102A), (ii) information regarding the modifications to the operation data, (iii) a backup request for at least a portion of the operation data, and/or (iv) other information usable for establishing a secure connection using out-of-band communication channel 252. By providing the notification to operation data management server 104, operation data management server 104 may perform a backup process for the operation data.

Backup process 208 may be initiated based on the notification. For example, operation data management server 104 may perform backup process 208 (i) automatically upon obtaining the backup request (e.g., backup process 208 may be initiated by data processing system 102A), and/or (ii) if warranted, based on analysis of the information regarding the modifications to the operation data (e.g., backup process 208 may be initiated by operation data management server 104). Backup process 208 may also be initiated automatically, for example, (e.g., by operation data management server 104) based on a pre-determined backup schedule.

If, for example, backup process 208 is initiated by operation data management server 104, then backup process 208 may include generating a backup request. However, if backup process 208 is initiated by another entity (e.g., data processing system 102A), then backup process 208 may not include generating the backup request. The backup request may include, for example, information regarding the operation data (e.g., targeted for backup) and/or other information usable for establishing a secure connection using out-of-band communication channel 252.

During backup process 208, in order to provide the backup request to management controller 152, operation data management server 104 may identify out-of-band hardware resources of data processing system 102A using the identifying information of data processing system 102A and/or the user thereof. For example, operation data management server 104 may associate a device identifier of data processing system 102A with its management controller (e.g., management controller 152) as well as information required to establish an out-of-band communication channel with its management controller (e.g., a network address for out-of-band communications associated with the device identifier of data processing system 102A).

At interaction 210, the backup request may be provided to management controller 152 by operation data management server 104. For example, the backup request may be provided to management controller 152 over out-of-band communication channel 252 via (i) transmission via a message, (ii) storing in a storage with subsequent retrieval by management controller 152, (iii) a publish-subscribe system where management controller 152 subscribes to updates from operation data management server 104 thereby causing a copy of the notification to be propagated to management controller 152, and/or (iv) other processes. By providing the backup request to management controller 152, management controller 152 may perform a backup process complementary to backup process 208.

To back up operation data of data processing system 102A, management controller 152 may perform backup process 212. Backup process 212 may include (i) identifying operation data targeted for backup (e.g., based on information included in the backup request obtained from operation data management server 104, or the operation data targeted for backup may have been identified as part of monitoring process 204), (ii) obtaining the operation data from hardware resources 150 (e.g., via data transfer using side-band communication channel 250), and/or (iii) providing the operation data to other entities for backup purposes (e.g., via data transfer using out-of-band communication channel 252).

At interaction 214, the operation data (e.g., targeted for backup) may be provided to operation data management server 104 by management controller 152. For example, the operation data may be provided to operation data management server 104 over out-of-band communication channel 252 via (i) transmission via a message, (ii) storing in a storage with subsequent retrieval by operation data management server 104, (iii) a publish-subscribe system where operation data management server 104 subscribes to updates from management controller 152 thereby causing a copy of the operation data to be propagated to operation data management server 104, and/or (iv) other processes. By providing the operation data to operation data management server 104, operation data management server 104 may complete performance of backup process 208.

To complete performance of backup process 208, operation data management server 104 may include (i) obtaining the operation data, (ii) preparing the operation data for storage (e.g., adding and/or modifying metadata of the operation data), (iii) storing the operation data (e.g., in a repository managed by a database (not shown)), and/or (iv) performing other operations that may relate to data storage.

Thus, to manage operation data for data processing systems, the operation data may be backed up (e.g., as determined by a backup schedule, or in real-time as modifications to the operation data are detected) using secure out-of-band communications. By doing so, the backed-up operation data may be made available to the data processing systems in future circumstances where recovery of the operation data is warranted.

Turning to FIG. 2B, a second interaction diagram in accordance with an embodiment is shown. The second interaction diagram may illustrate processes and interactions that may occur during recovery of operation data of a data processing system (e.g., 102A). As previously discussed, data processing system 102A may operate in accordance with operation data defined to facilitate providing computer-implemented services desired by consumers of the computer-implemented services. However, due to circumstances that may impact the availability and/or quality of the operation data to data processing system 102A, a distributed recovery process for the user defined operation data may be initiated.

In a first example, the (distributed) recovery process may be initiated by management controller 152. For example, management controller 152 may identify a condition impacting hardware resources 150 based on monitored activity and/or operation of hardware resources 150 (refer to the discussion of FIG. 2A for more details regarding monitoring processes). The identified condition may, for example, include (i) a lack of operation of one or more in-band components, (ii) an operation of one or more in-band components that is not in alignment with the operation data, (iii) a providing of undesired or reduced-quality computer-implemented services, and/or (iv) any other condition that may implicate a need for recovering operation data of data processing system 102A (e.g., if undesired modifications are made to the operation data). Once the condition is identified, management controller 152 may generate and/or send a notification to initiate the distributed recovery process for impacted hardware resources 150.

At interaction 216, the notification may be provided to operation data management server 104 by management controller 152. For example, the notification may be provided to operation data management server 104 over out-of-band communication channel 252 via (i) transmission via a message, (ii) storing in a storage with subsequent retrieval by operation data management server 104, (iii) a publish-subscribe system where operation data management server 104 subscribes to updates from management controller 152 thereby causing a copy of the notification to be propagated to operation data management server 104, and/or (iv) other processes.

The notification may include, for example, (i) identifying information of data processing system 102A and/or a user thereof (e.g., usable by operation data management server 104 to identify (backed-up) operation data associated with the identifying information), (ii) information regarding the identified condition (e.g., including timestamp information that may be usable to identify a version of the operation data), (iii) a recovery request for the operation data, and/or (iv) other information usable for establishing a secure connection using out-of-band communication channel 252. By providing the notification to operation data management server 104, operation data management server 104 may recover (backed-up) operation data for data processing system 102A.

In a second example, the distributed recovery process may be initiated by a device other than management controller 152, such as a service device (e.g., operated by service technicians), a user device (e.g., of user devices 103, operated by a user), etc. For example, a user operating a user device may, for various reasons, initiate a recovery request for operation data for data processing system 102A, prompting the user device to generate the recovery request. The user device may provide the recovery request to operation data management server 104 (e.g., using a network and/or communication channels other than the network and/or communication channels used by hardware resources 150). The recovery request may include (i) identifying information of data processing system 102A and/or the user (e.g., usable to identify operation data associated with the identifying information), (ii) information usable to identify a version of the operation data, and/or (iii) other information usable for recovering operation data.

At interaction 218, the recovery request may be provided to operation data management server 104 by a device (e.g., the user device). For example, the device may provide the recovery request may be provided to operation data management server 104 via (i) transmission via a message, (ii) storing in a storage with subsequent retrieval by operation data management server 104, (iii) a publish-subscribe system where operation data management server 104 subscribes to updates from a recovery request management system (not shown) thereby causing a copy of the recovery request to be propagated to operation data management server 104, and/or (iv) other processes. By providing the recovery request to operation data management server 104, operation data management server 104 may recover operation data for data processing system 102A.

To recover operation data, operation data management server 104 may perform recovery process 220. During recovery process 220, operation data management server 104 may use information included in the notification and/or the recovery request to (i) identify operation data and/or a version of the operation data (e.g., by searching a database managing operation data stored in a data repository prior to obtaining the recovery request), (ii) identify an out-of-band component of data processing system 102A (e.g., management controller 152 and associated information usable to establish an out-of-band communication channel with management controller 152), and/or (iii) provide the (identified version of the) operation data to data processing system 102A using the out-of-band component.

At interaction 222, the operation data may be provided to management controller 152 by operation data management server 104. For example, the operation data may be provided (e.g., pushed) to management controller 152 over out-of-band communication channel 252 via (i) transmission via a message, (ii) storing in a storage with subsequent retrieval by management controller 152, (iii) a publish-subscribe system where management controller 152 subscribes to updates from operation data management server 104 thereby causing a copy of the operation data to be propagated to management controller 152, and/or (iv) other processes. By providing the operation data to management controller 152, management controller 152 may perform a recovery process complementary to recovery process 220.

Upon obtaining the operation data from operation management server 104, management controller 152 may perform recovery process 224 (e.g., obtaining the operation data may initiate performance of recovery process 224). During recovery process 224, management controller 152 may conform the operation of hardware resources 150 as specified by the operation data to obtain updated operation of hardware resources 150. For example, management controller 152 may make modifications to existing operation data of data processing system 102A that may result in modified (e.g., updated) operation of hardware resources 150.

Management controller 152 may obtain the operation data from operation data management server 104, for example, while hardware resources 150 are inoperable due to being unpowered. If hardware resources 150 are unpowered, then management controller 150 may, for example, store the operation data locally until hardware resources 150 become powered in order to update the operation of hardware resources 150 (e.g., as specified by the operation data).

During recovery process 224, in order to conform the operation of hardware resources 150 to the operation data, management controller 152 may perform one or more actions. The actions may be performed by transmitting data (e.g., messages) to and/or receiving data (e.g., messages) from hardware resources 150 over side-band communication channel 250. The actions performed by management controller 152 may include, for example, (i) providing at least a portion of the operation data to an agent hosted by hardware resources 150, (ii) initiating installation of software on hardware resources 150 using the agent (e.g., based on software specified by the portion of the operation data), and/or (iii) updating a configuration of an in-band component of hardware resources 150 using (e.g., a configuration setting specified by) the operation data.

Management controller 152 may perform one or more of the actions automatically, or based on user input (e.g., depending on the source of initiation of the recovery request). For example, if the recovery request was initiated by management controller 152 (e.g., and not by the user), then management controller may prompt the user of data processing system 102A (e.g., via transmission of a message to hardware resources 150 using side-band communication channel 250) to accept modifications to the operation of hardware resources 150 as specified by the operation data before performing the actions. However, if the recovery request was initiated by the user, then management controller 152 may perform the actions automatically (e.g., without user input and/or user intervention).

Once the operation of hardware resources 150 have been conformed to the operation data, data processing system 102A may provide computer-implemented services using the updated operation of hardware resources 150. For example, by updating the operation of hardware resources 150, data processing system 102A may be able to provide the desired computer-implemented services, which may be expected by and/or relied upon by the user.

Thus, to manage operation data for data processing systems, the operation data may be recovered (e.g., automatically using out-of-band components of the data processing systems, and/or by users of the data processing systems and/or other entities) using secure out-of-band communications. By doing so, the likelihood of the data processing systems providing the desired computer-implemented services (e.g., to the users and/or other consumers of the computer-implemented services) may be increased.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to manage operation data of (e.g., and therefore the provision of desired computer-implemented services by) data processing systems.

FIGS. 3A-3B illustrate methods that may be performed by the components of the system of FIGS. 1A-2B. In the diagrams discussed below and shown in FIGS. 3A-3B, any of the operations may be repeated, performed in different orders, and/or performed in parallel with or in a partially overlapping in time manner with other operations. The methods described with respect to FIGS. 3A-3B may be performed by a data processing system, and/or another device.

Turning to FIG. 3A, a first flow diagram illustrating a method for backing up operation data of a data processing system is shown in accordance with an embodiment. The method may be performed by the system of FIGS. 1A-1B.

The following operations (e.g., 302-304) may be performed prior to recovering the operation data and/or may be performed as preparation steps for managing operation data recovery (discussed further with respect to FIG. 3B). As discussed previously (refer to FIGS. 1A-1B), the data processing system may include components such as a management controller and any number of hardware resources that may operate in accordance with operation data of the data processing system.

At operation 302, the management controller may identify a modification to operation of the hardware resources. The modification may be identified by performing a monitoring process to monitor activity and/or operation of the hardware resources. During the monitoring process, management controller may obtain information regarding the modification by (i) obtaining reports from the hardware resources via a side-band communication channel, and/or (ii) snooping activity of the hardware resources via the side-band communication channel. Refer to FIG. 2A for more information regarding communications between a management controller and hardware resources of a data processing system, and/or monitoring processes.

The information regarding the modification may be used, for example, to facilitate making of the same modification to the operation data (e.g., when the information regarding the modification is provided to a data processing system undergoing an operation data recovery process).

At operation 304, the management controller may provide information regarding the modification to an operation data management server. The information regarding the modification may be provided, for example, as a notification, by transmitting the notification to the operation data management server via an out-of-band communication channel. Refer to FIG. 2A for more information regarding communications between the operation data management server and the management controller, and/or initiation of a distributed backup process.

Based on the notification, the operation data management server may provide backup services for the operation data as part of a distributed backup process performed in cooperation with data processing system (discussed in detail with respect to FIG. 2A). For example, the operation data management server may obtain the operation data of data processing system from the management controller, and the operation data may be stored in a data repository managed by operation data management server or another entity (e.g., for future use in circumstances that may necessitate recovery of the operation data).

For example, the management controller may identify a condition impacting the hardware resources that may indicate recovery of the operation data is warranted. The condition may be identified by monitoring the activity and/or the operation of the hardware resources and determining, based on the activity and/or the operation, whether an operation data recovery process should be initiated.

If the activity and/or the operation do not indicate that the operation data recovery process should be initiated, then the management controller may, for example, continue monitoring the activity and/or the operation of the hardware resources. If the activity and/or the operation indicate that the operation data recovery process should be initiated, then the management controller may generate and/or send a notification (e.g., via an out-of-band communication channel) to the operation data management server in order to initiate the operation data recovery process for the hardware resources.

The method may end following operation 304.

Turning to FIG. 3B, a second flow diagram illustrating a method for recovering operation data for a data processing system is shown in accordance with an embodiment. The method may be performed by the system of FIGS. 1A-1B. The following operations (e.g., 352-356) may be performed following an operation data backup process (e.g., performed, in part, by an operation data management server) and/or in a circumstance where recovery of the operation data for the data processing system is warranted.

At operation 352, the management controller may obtain operation data from the operation data management server via an out-of-band communication channel. The operation data may be obtained by (i) receiving the operation data using the out-of-band communication channel established with the operation data management server (and/or another entity), (ii) reading the operation data from storage, and/or (iii) any other methods.

Prior to obtaining the operation data, operation data management server may obtain a notification (e.g., a recovery request) that may initiate an operation data recovery process for the hardware resources. The notification may be obtained by (i) reading the notification from storage, (ii) receiving the notification from a device (e.g., the management controller, a user device, a service device, etc.), and/or (iii) any other methods.

Using information included with the notification, operation data management server may identify the operation data and/or the management controller of the data processing system (e.g., using identifying information included in the recovery request). For example, the operation data and the management controller may be identified by querying one or more databases that may associate device identifiers with operation data and/or information regarding out-of-band components of the devices (e.g., management controller identifiers and/or network addresses usable to establish out-of-band communication channels with the management controllers).

Once the operation data is identified and an out-of-band communication is established, operation data management server may provide the operation data via the out-of-band communication channel to the management controller. Refer to the discussion of interaction 222 of FIG. 2B for more details regarding providing the operation data to the management controller via an out-of-band communication channel. Once provided, the operation data may, for example, be used to update operation of the hardware resources.

At operation 354, the management controller may conform the operation of the hardware resources as specified by the operation data to obtain updated operation of the hardware resources. The operation of the hardware resources may be conformed by (i) installing software on the hardware resources using the operation data, and/or (ii) updating a configuration of a hardware component of the hardware resources using the operation data (e.g., by modifying registry settings, values, etc., of the hardware component based on settings specified by the operation data).

For example, the management controller may provide at least a portion of the operation data to an agent hosted by the hardware resources to initiate installation of software on the hardware resources using the agent. To do so, the management controller may, for example, transmit (e.g., via a side-band communication channel) the portion of the operation data to the agent. Upon obtaining the portion of the operation data, the agent may modify and/or execute computer instructions (e.g., based on the portion of the operation data) in order to initiate the installation of the software.

By doing so, updated operation of the hardware resources may be obtained. The updated operation may match a past operation of the data processing system (or a past operation of a second data processing system from which the operation data was obtained during a backup process).

At operation 356, a computer-implemented service may be provided using the updated operation of the hardware resources. The computer-implemented service may be provided by initiating functionality of the hardware resources. For example, the user may initiate execution of computer instructions that may be performed by the (updated) hardware resources of the data processing system. The computer-implemented services may be more likely to include desired computer-implemented services when performed using the updated hardware resources.

The method may end following operation 356.

As illustrated above, embodiments disclosed herein may provide systems and methods usable to manage operation data of data processing systems. The operation data may be managed automatically and/or in real-time using out-of-band communication channels, reducing the likelihood of disruptions in providing of desired computer-implemented services.

Thus, embodiments disclosed herein may provide an improved computing device for managing operation data using out-of-band components and/or communications. By managing the operation data without relying on in-band communication channels which may be inoperable and/or unsecure, the likelihood of the operation data being modified, leaked, and/or otherwise compromised may be reduced. Accordingly, the disclosed process may provide for both an improvement in computing technology and an improved method for managing the security of data processing systems.

Figure 4:
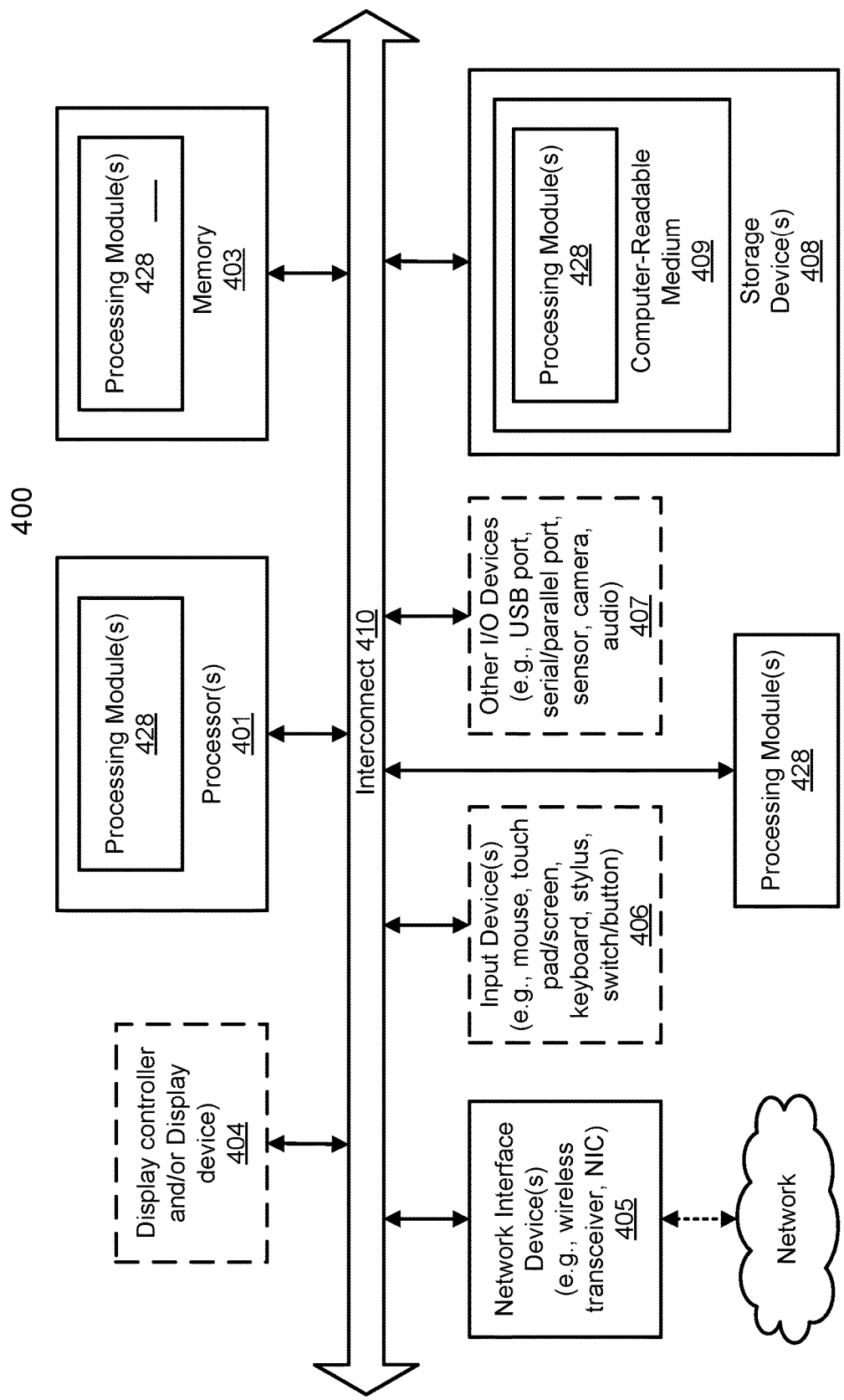
FIG. 4 shows a block diagram illustrating a data processing system in accordance with an embodiment.

Any of the components illustrated in FIGS. 1A-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a computer readable medium (namely, in a non-transitory computer readable medium). A machine-readable medium may include any mechanism for storing information in a form readable by a machine (e.g., a computer) in a transitory or non-transitory manner (e.g., the machine-readable medium may be implemented in the form of non-transitory media or transitory media, respectively). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:
    obtaining, by a management controller of the data processing system and via an out-of-band communication channel, operation data from an operation data management server, the operation data being usable to update operation of hardware resources of the data processing system, and the updated operation matching a past operation of a second data processing system based on the operation data, wherein the data processing system comprises a network module adapted to separately advertise network endpoints for the management controller and the hardware resources, and the network endpoints are usable by the operation data management server to address communications to the hardware resources and the management controller;
    conforming, by the management controller, the operation of the hardware resources as specified by the operation data to obtain the updated operation of the hardware resources; and
    providing a computer-implemented service using the updated operation of the hardware resources.

2. The method of claim 1, further comprising:
    prior to obtaining the operation data:
        identifying, by the management controller, a condition impacting the hardware resources; and
        sending, by the management controller and via the out-of-band communication channel, a notification to initiate an operation data recovery process for the hardware resources.

3. The method of claim 1, wherein the operation data is defined by a user of the data processing system.

4. The method of claim 1, wherein conforming the operation of the hardware resources comprises:
    providing, by the management controller, at least a portion of the operation data to an agent hosted by the hardware resources to initiate installation of software on the hardware resources using the agent.

5. The method of claim 1, wherein conforming the operation of the hardware resources comprises:
    updating a configuration of a hardware component of the hardware resources using the operation data.

6. The method of claim 1, further comprising:
    prior to obtaining the operation data:
        identifying, by the management controller, a modification to the operation of the hardware resources, the modification being a result of user activity; and
        providing, by the management controller, information regarding the modification to the operation data management server to facilitate making of a same future modification.

7. The method of claim 1, further comprising:
    prior to obtaining the operation data:
        obtaining, by the operation data management server, a notification to initiate an operation data recovery process for the hardware resources;
        identifying, by the operation data management server, the operation data based on the notification;
        identifying, by the operation data management server, the management controller based on the notification; and
        providing, by the operation data management server and via the out-of-band communication channel, the operation data to the management controller.

8. The method of claim 1, wherein the management controller and the network module are on separate power domains from the hardware resources so that the management controller and the network module are operable while the hardware resources are inoperable.

9. The method of claim 8, wherein the operation data is obtained while the hardware resources are inoperable due to being unpowered.

10. The method of claim 1, wherein the out-of-band communication channel runs through the network module, and an in-band communication channel that services the hardware resources also runs through the network module.

11. The method of claim 1, wherein the management controller hosts a transmission control protocol/internet protocol (TCP/IP) stack to facilitate network communications via the out-of-band communication channel.

12. A non-transitory machine-readable medium having instructions stored therein, which when executed by a processor, cause the processor to perform operations for managing a data processing system, the operations comprising:
    obtaining, by a management controller of the data processing system and via an out-of-band communication channel, operation data from an operation data management server, the operation data being usable to update operation of hardware resources of the data processing system, and the updated operation matching a past operation of a second data processing system based on the operation data, wherein the data processing system comprises a network module adapted to separately advertise network endpoints for the management controller and the hardware resources, and the network endpoints are usable by the operation data management server to address communications to the hardware resources and the management controller;
    conforming, by the management controller, the operation of the hardware resources as specified by the operation data to obtain the updated operation of the hardware resources; and
    providing a computer-implemented service using the updated operation of the hardware resources.

13. The non-transitory machine-readable medium of claim 12, the operations further comprising:
    prior to obtaining the operation data:
        identifying, by the management controller, a condition impacting the hardware resources; and sending, by the management controller and via the out-of-band communication channel, a notification to initiate an operation data recovery process for the hardware resources.

14. The non-transitory machine-readable medium of claim 12, wherein the operation data is defined by a user of the data processing system.

15. The non-transitory machine-readable medium of claim 12, wherein conforming the operation of the hardware resources comprises:
providing, by the management controller, at least a portion of the operation data to an agent hosted by the hardware resources to initiate installation of software on the hardware resources using the agent.

16. A data processing system, comprising:
a processor; and
a memory coupled to the processor to store instructions, which when executed by the processor, cause the processor to perform operations for managing the data processing system, the operations comprising:
obtaining, by a management controller of the data processing system and via an out-of-band communication channel, operation data from an operation data management server, the operation data being usable to update operation of hardware resources of the data processing system, and the updated operation matching a past operation of a second data processing system based on the operation data, wherein the data processing system comprises a network module adapted to separately advertise network endpoints for the management controller and the hardware resources, and the network endpoints are usable by the operation data management server to address communications to the hardware resources and the management controller,
conforming, by the management controller, the operation of the hardware resources as specified by the operation data to obtain the updated operation of the hardware resources, and
providing a computer-implemented service using the updated operation of the hardware resources.

17. The data processing system of claim 16, the operations further comprising:
prior to obtaining the operation data:
identifying, by the management controller, a condition impacting the hardware resources; and
sending, by the management controller and via the out-of-band communication channel, a notification to initiate an operation data recovery process for the hardware resources.

18. The data processing system of claim 16, wherein the operation data is defined by a user of the data processing system.

19. The data processing system of claim 16, wherein conforming the operation of the hardware resources comprises:
providing, by the management controller, at least a portion of the operation data to an agent hosted by the hardware resources to initiate installation of software on the hardware resources using the agent.

20. The data processing system of claim 16, wherein the management controller and the network module are on separate power domains from the hardware resources so that the management controller and the network module are operable while the hardware resources are inoperable.

* * * * *